US011157280B2

(12) United States Patent
Boersma et al.

(10) Patent No.: US 11,157,280 B2
(45) Date of Patent: Oct. 26, 2021

(54) DYNAMIC FUSION BASED ON OPERAND SIZE

(71) Applicant: International Business Machines Corporation, Armonk, NY (US)

(72) Inventors: Maarten J. Boersma, Holzgerlingen (DE); Bruce Fleischer, Bedford Hills, NY (US); Robert A. Philhower, Valley Cottage, NY (US); Balaram Sinharoy, Poughkeepsie, NY (US)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 300 days.

(21) Appl. No.: 15/834,403

(22) Filed: Dec. 7, 2017

(65) Prior Publication Data
US 2019/0179639 A1    Jun. 13, 2019

(51) Int. Cl.
*G06F 9/30*    (2018.01)
*G06F 9/38*    (2018.01)

(52) U.S. Cl.
CPC ........ *G06F 9/30181* (2013.01); *G06F 9/3016* (2013.01); *G06F 9/30127* (2013.01); *G06F 9/3855* (2013.01); *G06F 9/30149* (2013.01)

(58) Field of Classification Search
CPC ............ G06F 9/30149; G06F 9/30127; G06F 9/30181; G06F 9/3855; G06F 9/3016
See application file for complete search history.

(56) References Cited

U.S. PATENT DOCUMENTS

| | | | | |
|---|---|---|---|---|
| 6,516,408 | B1 * | 2/2003 | Abiko | G06F 5/01 712/227 |
| 6,684,332 | B1 * | 1/2004 | Douglas | H04L 63/0823 713/161 |
| 7,502,911 | B2 * | 3/2009 | Sih | G06F 9/30014 712/205 |
| 7,818,550 | B2 | 10/2010 | Vaden | |
| 8,447,800 | B2 | 5/2013 | Dockser et al. | |
| 8,645,935 | B2 | 2/2014 | Barua et al. | |
| 8,904,151 | B2 | 12/2014 | Gschwind et al. | |

(Continued)

FOREIGN PATENT DOCUMENTS

JP         04342037 A    * 11/1992

OTHER PUBLICATIONS

List of IBM Patents or Patent Applications Treated as Related; Date Filed: Dec. 7, 2017, p. 1-2.

(Continued)

*Primary Examiner* — William B Partridge
(74) *Attorney, Agent, or Firm* — Cantor Colburn LLP; Teddi Maranzano

(57) ABSTRACT

Aspects of the invention include receiving, by a processor, a plurality of instructions at an instruction pipeline. The processor can further determine an operand bit field size for each of the received plurality of instructions. The processor can further compare the operand bit field size of at least a subset of the received instructions to a predetermined threshold. The processor can further fuse at least two of the received instructions that have an operand bit field size that meets the predetermined threshold. The processor can further perform an execution stage within the instruction pipeline to execute the received instructions, including the fused instructions.

20 Claims, 4 Drawing Sheets

(56) References Cited

U.S. PATENT DOCUMENTS

| | | |
|---|---|---|
| 9,110,713 B2 | 8/2015 | Wang |
| 9,329,848 B2 | 5/2016 | Lupon et al. |
| 9,405,547 B2 | 8/2016 | Want et al. |
| 9,477,476 B2 | 10/2016 | Brown et al. |
| 2002/0087955 A1* | 7/2002 | Ronen .................. G06F 9/3001 717/151 |
| 2007/0165028 A1* | 7/2007 | Hsu ...................... G06T 15/005 345/426 |
| 2010/0115248 A1 | 5/2010 | Ouziel et al. |
| 2014/0089638 A1 | 3/2014 | Mylius et al. |
| 2016/0179542 A1* | 6/2016 | Lai ....................... G06F 9/3001 712/208 |
| 2017/0123808 A1 | 5/2017 | Caulfield et al. |
| 2017/0177343 A1 | 6/2017 | Lai et al. |
| 2017/0371667 A1* | 12/2017 | Fei ...................... G06F 9/30145 |
| 2018/0095752 A1 | 4/2018 | Kudaravalli et al. |
| 2018/0095761 A1 | 4/2018 | Winkel et al. |

OTHER PUBLICATIONS

Maarten J. Boersma, et al.,"Dynamic Fusion Based on Operand Size,", U.S. Appl. No. 15/834,413, filed Dec. 7, 2017.

* cited by examiner

DYNAMIC FUSION BASED ON OPERAND SIZE

BACKGROUND

Embodiments of the present invention relate in general to an out-of-order (OoO) processor and more specifically to fusing instructions based on an operand instruction size.

In an OoO processor, an instruction sequencing unit (ISU) dispatches instructions to various issue queues, renames registers in support of OoO execution, issues instructions from the various issue queues to the execution pipelines, completes executed instructions, and handles exception conditions. Register renaming is typically performed by mapper logic in the ISU before the instructions are placed in their respective issue queues. The ISU includes one or more issue queues that contain dependency matrices for tracking dependencies between instructions. A dependency matrix typically includes one row and one column for each instruction in the issue queue.

Instruction fusion is a process that combines information from two adjacent instructions into a single instruction, such that the single instruction runs faster than processing the two instructions separately. Adjacent instructions refer to instruction locations after dispatch group formation in which instructions are formed into groups and dispatched together.

SUMMARY

Embodiments of the present invention include methods, systems, and computer program products for implementing dynamic fusion based on operand size. A non-limiting example of the computer-implemented method includes receiving, by a processor, a plurality of instructions at an instruction pipeline. The processor can further determine an operand bit field size for each of the received plurality of instructions. The processor can further compare the operand bit field size of at least a subset of the received instructions to a predetermined threshold. The processor can further fuse at least two of the received instructions that have an operand bit field size that meets the predetermined threshold. The processor can further perform an execution stage within the instruction pipeline to execute the received instructions, including the fused instructions.

Embodiments of the present invention are directed to a system. A non-limiting example of the system can include one or more processors in communication with one or more types of memory. The processor can be configured to receive a plurality of instructions at an instruction pipeline. The processor can be configured to determine an operand bit field size for each of the received plurality of instructions. The processor can be configured to compare the operand bit field size of at least a subset of the received instructions to a predetermined threshold. The processor can be configured to fuse at least two of the received instructions that have an operand bit field size that meets the predetermined threshold. The processor can also be configured to perform an execution stage within the instruction pipeline to execute the received instructions, including the fused instructions.

Embodiments of the present invention are directed to a computer program product that can include a storage medium readable by a processor that can store instructions for execution by the processor to perform operations. A non-limiting example of the computer program product can include a processor that can receive a plurality of instructions at an instruction pipeline. The processor can determine an operand bit field size for each of the received plurality of instructions. The processor can compare the operand bit field size of at least a subset of the received instructions to a predetermined threshold. The processor can fuse at least two of the received instructions that have an operand bit field size that meets the predetermined threshold. The processor can also perform an execution stage within the instruction pipeline to execute the received instructions, including the fused instructions.

Additional features and advantages are realized through the techniques of the present invention. Other embodiments and aspects of the invention are described in detail herein and are considered a part of the claimed invention. For a better understanding of the invention with the advantages and the features, refer to the description and to the drawings.

BRIEF DESCRIPTION OF THE DRAWINGS

The specifics of the exclusive rights described herein are particularly pointed out and distinctly claimed in the claims at the conclusion of the specification. The foregoing and other features and advantages of the embodiments of the invention are apparent from the following detailed description taken in conjunction with the accompanying drawings in which:

Figure 1:
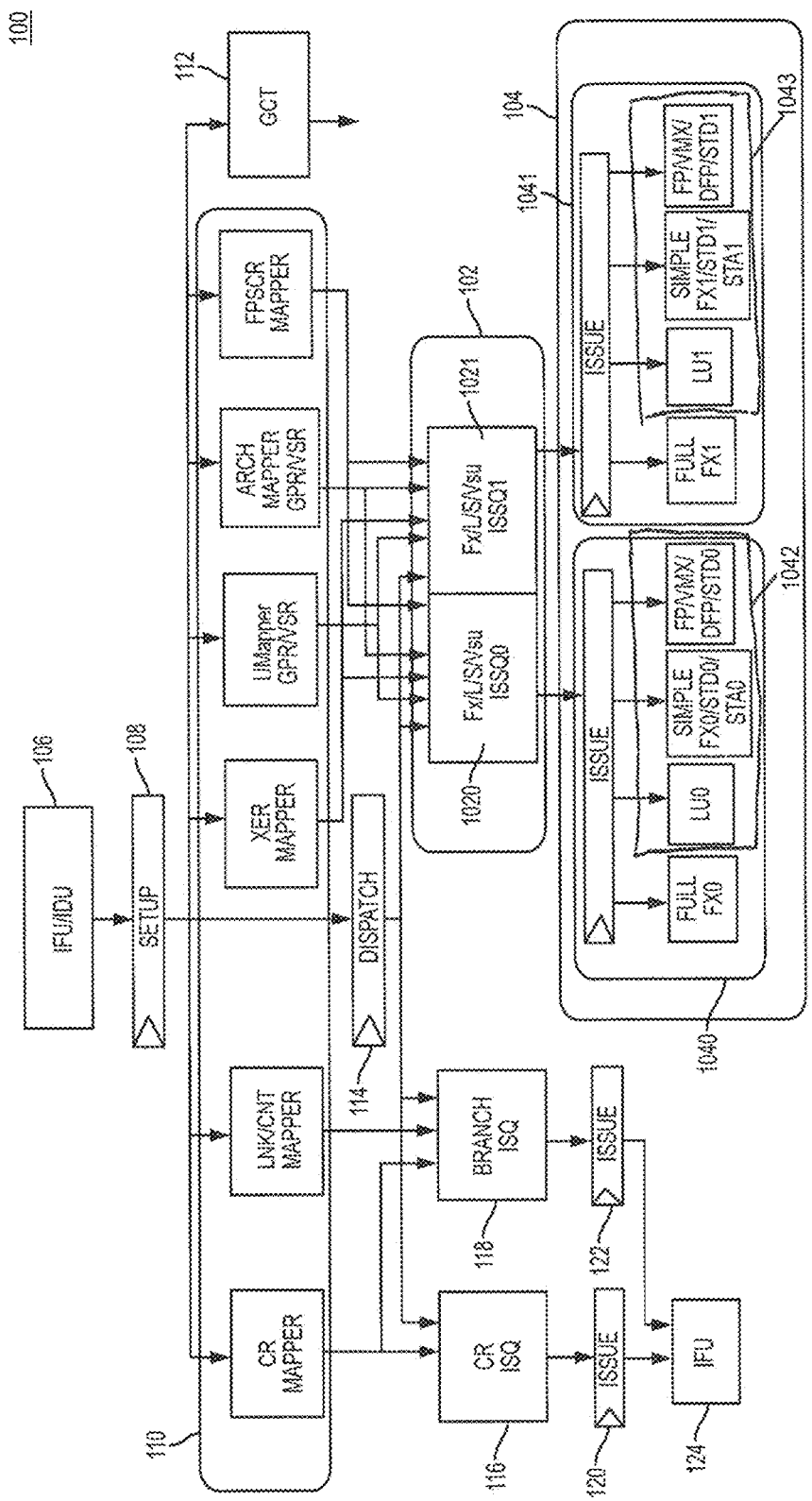
FIG. 1 depicts a block diagram of a system that includes an instruction sequencing unit (ISU) of an out-of-order (OoO) processor for implementing dynamic fusion based on operand size with one or more embodiments of the present invention.

The diagrams depicted herein are illustrative. There can be many variations to the diagram or the operations described therein without departing from the spirit of the invention. For instance, the actions can be performed in a differing order or actions can be added, deleted or modified. In addition, the term "coupled" and variations thereof describes having a communications path between two elements and does not imply a direct connection between the elements with no intervening elements/connections between them. All of these variations are considered a part of the specification.

In the accompanying figures and following detailed description of the disclosed embodiments, the various elements illustrated in the figures are provided with two or three digit reference numbers. With minor exceptions, the leftmost digit(s) of each reference number correspond to the figure in which its element is first illustrated.

DETAILED DESCRIPTION

One or more embodiments of the present invention are related to fusing instructions based on operand size. An operand is a portion of an instruction that specifies data that will be manipulated, or on which an operation will be performed. Instructions can have one to three operands, which can vary in size. The size of an operand can dictate how many clock cycles are required to complete the instruction.

Instruction fusion is a process that combines information from two adjacent instructions into a single instruction, such that the single instruction runs faster than processing the two instructions separately. With regard to the instruction fusion process, adjacent instructions can be consecutive instructions or instructions that are near each other. Performance based on fusion can be aided by fusing two or more instructions having an operand size that meet a predetermined threshold.

In order to increase performance, some processors can fuse or merge certain instructions. Many instructions can be fused, for example, two OR immediate instructions can be fused (ori+ori), an OR instruction can be fused with an add immediate (addi) instruction, etc. The fusing of instructions can occur in a variety of phases/stages of the execution pipeline.

One phase in the pipeline in which instruction fusion can occur is before instructions are entered into an instruction cache (I-cache). Some of the strengths associated with fusing instructions at this phase can include: additional clock cycle(s) required during fusion would have less of a performance impact; fusion improves fetch, dispatch and issue bandwidth and reduces latency. Some of the weaknesses associated with fusing instructions at this phase can include: the start of a basic block is not known (target of a branch); branch predictions are not known causing difficulty in fusing instructions across conditional branches; fusion at the I-cache would be prior to register renaming so anti-dependency and output-dependency would limit the amount of fusion that can occur; and because the basic blocks are not known, fusing non-consecutive instructions is more difficult.

Another phase in the pipeline in which instruction fusion can occur is after instructions are removed from an instruction buffer (I-buffer). Some of the strengths associated with fusing instructions at this phase can include: fusion of non-consecutive instructions because branch predictions are known; additional clock cycle(s) for fusion could be hidden if done in parallel with the register renaming; and fusion improves dispatch and issue bandwidth and reduces latency, but does not improve fetch bandwidth. A weakness associated with fusing instructions at this phase can be that fusion at the I-buffer would be prior to register renaming so anti-dependency and output-dependency will limit the amount of fusion that can occur.

Another phase in the pipeline in which instruction fusion can occur is when a trace cache or loop cache is created and instructions are fused in this cache. The fused instructions are then fetched from the trace or loop cache. Some of the strengths associated with fusing instructions at this phase can include: because this operation can occur offline, no additional cycles are needed for fusion; a fusion window can be larger because there is no severe timing pressure; and fetch, dispatch and issue bandwidth is improved. Some of the weaknesses associated with fusing instructions at this phase can include: poor hit rates in a loop cache; fusion in the loop or trace cache would be prior to register renaming so anti-dependency and output-dependency will limit the amount of fusion that can occur; and prediction accuracy of the small trace cache will be lower than large branch prediction tables.

Another phase in the pipeline in which instruction fusion can occur is after register rename. Some of the strengths associated with fusing instructions at this phase can include: fusion of non-consecutive instructions because branch predictions are known, fusion is not limited due to anti-dependency and output-dependency and fusion improves issue bandwidth when an instruction is eliminated and reduces latency, but does not improve fetch and dispatch bandwidth. A weakness associated with fusing instructions at this phase can be that additional clock cycle(s) used because of fusion cannot be hidden.

One or more embodiments of the invention can fuse instructions based on an operand bit field size for the instruction. The above-described aspects and embodiments of the invention recognize that, from a performance enhancement perspective, fusing instructions having an operand bit field size greater than a predetermined threshold is not practical. Accordingly, the above-described aspects and embodiments of the invention can inspect each instruction to determine an operand bit field size associated with the instruction and perform fusion on those instructions having an operand bit field size determined to meet the predetermined threshold.

Turning now to FIG. 1, a block diagram of a system 100 that includes an instruction sequencing unit (ISU) of an out-of-order (OoO) processor for implementing dynamic fusion based on operand size is generally shown according to one or more embodiments of the present invention. The system 100 shown in FIG. 1 includes an instruction fetch unit/instruction decode unit (IFU/IDU) 106 that fetches and decodes instructions for input to a setup block 108 which prepares the decoded instructions for input to a mapper 110 of the ISU. In accordance with one or more embodiments of the present invention, six instructions at a time from a thread can be fetched and decoded by the IFU/IDU 106. In accordance with one or more embodiments of the present invention, the six instructions sent to the setup block 108 can include six non-branch instructions, five non-branch instructions and one branch instruction, or four non-branch instructions and two branch instructions. In accordance with one or more embodiments of the present invention, the setup block 108 checks that sufficient resources such as entries in the issue queues, completion table, mappers and register files exist before transmitting the fetched instructions to these blocks in the ISU.

The mappers 110 shown in FIG. 1 map programmer instructions (e.g., logical register names) to physical resources of the processor (e.g., physical register addresses). A variety of mappers 110 are shown in FIG. 1 including a condition register (CR) mapper; a link/count (LNK/CNT) register mapper; an integer exception register (XER) mapper; a unified mapper (UMapper) for mapping general purpose registers (GPRs) and vector-scalar registers (VSRs); an architected mapper (ARCH Mapper) for mapping GPRs and VSRs; and, a floating point status and control register (FPSCR) mapper.

The output from the setup block 108 is also input to a global completion table (GCT) 112 for tracking all of the instructions currently in the ISU. The output from the setup block 108 is also input to a dispatch unit 114 for dispatching the instructions to an issue queue. The embodiment of the ISU shown in FIG. 1 includes a CR issue queue, CR ISQ 116, which receives and tracks instructions from the CR mapper and issues 120 them to instruction fetch unit (IFU) 124 to execute CR logical instructions and movement instructions. Also shown in FIG. 1 is a branch issue queue, Branch ISQ 118, which receives and tracks branch instructions and LNK/CNT physical addresses from the LNK/CNT mapper. Branch ISQ 118 can issue 122 an instruction to IFU 124 to redirect instruction fetching if a predicted branch address and/or direction was incorrect.

Instructions output from the dispatch logic and renamed registers from the LNK/CNT mapper, XER mapper, UMapper (GPR/VSR), ARCH Mapper (GPR/VSR), and FPSCR mapper are input to issue queue 102. As shown in FIG. 1, issue queue 102 tracks dispatched fixed-point instructions (FX), load instructions (L), store instructions (S), and vector-and-scalar unit (VSU) instructions. As shown in the embodiment of FIG. 1, issue queue 102 is broken up into two parts, ISQ0 1020 and ISQ1 1021, each portion holding N/2 instructions. When the processor is executing in single-thread (ST) mode, the issue queue 102 can be used as a single logical issue queue that contains both ISQ0 1020 and ISQ1 1021 to process all of the instructions (in this example all N instructions) of a single thread.

When the processor is executing in multi-thread (MT) mode, ISQ0 1020 can be used to process N/2 instructions from a first thread and ISQ1 1021 is used to process N/2 instructions from a second thread ISQ1 1021.

As shown in FIG. 1, issue queue 102 issues instructions to execution units 104, which are split into two groups of execution units 1040 1041. Both groups of execution units 1040 1041 shown in FIG. 1 include a full fixed point execution unit (Full FX0, Full FX1); a load execution unit (LU0, LU1); a simple fixed point, store data, and store address execution unit (Simple FX0/STD0/STA0, Simple FX1/STD1/STA1); and a floating point, vector multimedia extension, decimal floating point, and store data execution unit (FP/VMX/DFP/STD0, FP/VMX/DFP/STD1). Collectively, the LU0, the Simple FX0/STD0/STA0, and the FP/VMX/DFP/STD0 form a load-store unit (LSU) 1042. Similarly, the LU1, the Simple FX1/STD1/STA1, and the FP/VMX/DFP/STD1 form a load-store unit (LSU) 1043.

As shown in FIG. 1, when the processor is executing in ST mode, the first group of execution units 1040 execute instructions issued from ISQ0 1020 and the second group of execution units 1041 execute instructions issued from ISQ1 1021. In alternate embodiments of the present invention when the processor is executing in ST mode, instructions issued from both ISQ0 1020 and ISQ1 1021 in issue queue 102 can be issued to execution units in any of the execution units 1040 in the first group of execution units 1040 and the second group of execution units 1041.

In accordance with one or more embodiments of the present invention, when the processor is executing in MT mode, the first group of execution units 1040 execute instructions of the first thread issued from ISQ0 1020 and the second group of execution units 1041 execute instructions of the second thread issued from ISQ1 1021.

The number of entries in the issue queue 102 and sizes of other elements (e.g., bus widths, queue sizes) shown in FIG. 1 are intended to be exemplary in nature as embodiments of the present invention can be implemented for issue queues and other elements of a variety of different sizes. In accordance with one or more embodiments of the present invention, the sizes are selectable, or programmable.

Figure 2:
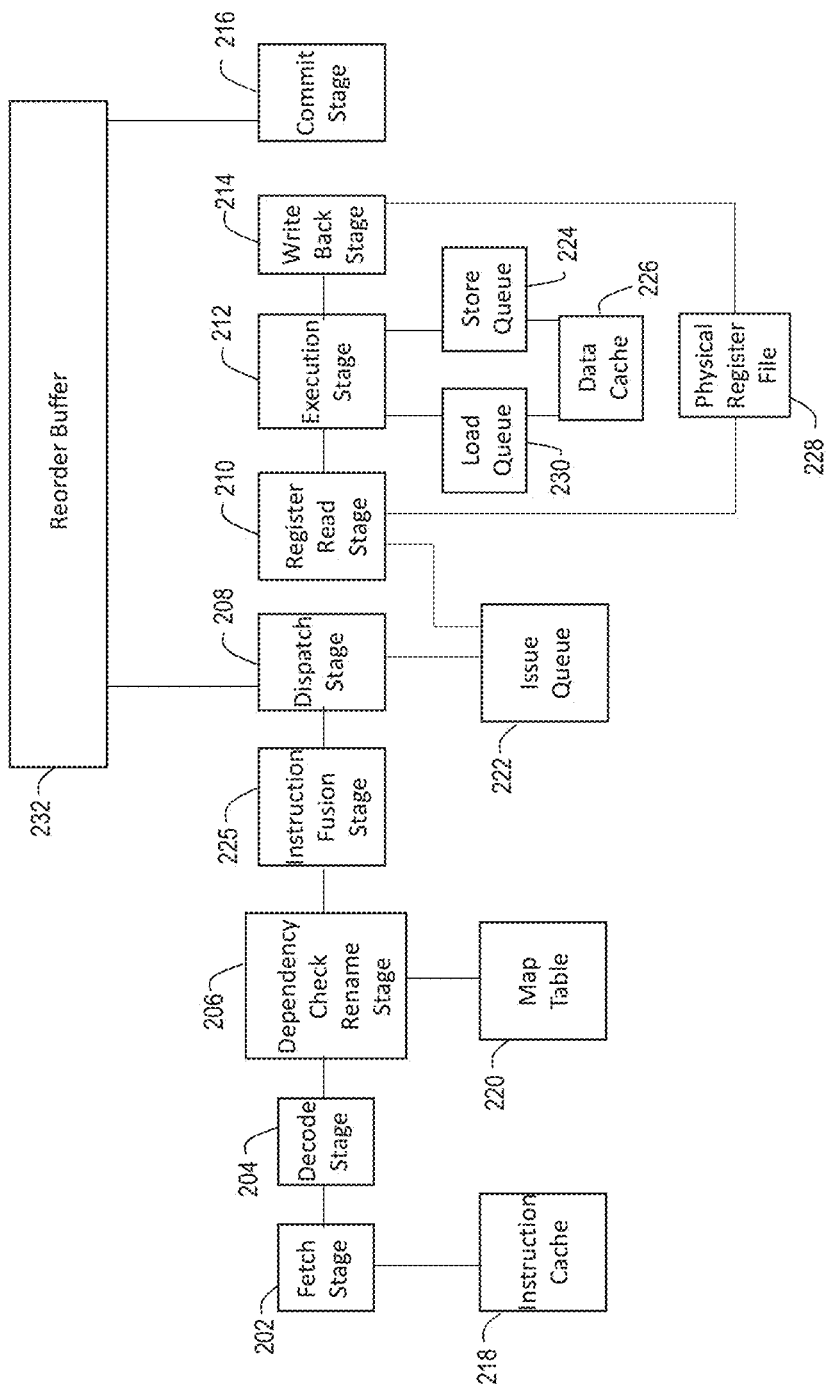
FIG. 2 depicts a block diagram of an OoO pipeline supporting OoO processing where instructions are processed OoO in accordance with one or more embodiments of the present invention.

Turning now to FIG. 2, a block diagram illustrating an out-of-order pipeline 200, supporting OoO processing on one or more threads where instructions are processed OoO by the IFU/IDU 106, is generally shown according to one or more embodiments of the present invention. Instruction pipelining is a technique to increase instruction throughput by splitting the processing of computer instructions into a series of steps with storage at the end of each step. Processors with instruction pipelining, i.e. pipelined processors, are internally organized into stages which can semi-independently work on separate jobs. Each stage is organized and linked with a next stage in a series chain so that each stage's output is fed to another stage until the final stage of the pipeline.

The OoO pipeline 200 processes each instruction based on the readiness of each instruction to be executed. The OoO pipeline 200 does not sit idle when an instruction that is to be processed is not ready to be executed. Rather, the OoO pipeline 200 bypasses an instruction that is missing information and executes the next instruction that is ready to be executed. OoO pipeline 200 includes a fetch stage 202, a decode stage 204, a dependency check rename stage 206, a dispatch stage 208, a register read stage 210, an execution stage 212, a write back stage 214, a commit stage 216, an instruction cache 218, a map table 220, issue queue 102, a store queue 224, a data cache 226, a physical register file 228, a load queue 230, and a reorder buffer 232.

OoO pipeline 200 depicts an exemplary implementation of an OoO pipeline and the stages and/or structures that an OoO pipeline may include. Fetch stage 202 retrieves an instruction stored in instruction cache 218. Instruction cache 218 stores copies of the instruction located in main memory so that fetch stage 202 retrieves a copy of the instruction from the instruction cache 218 rather than accessing a main memory for the instruction. Fetch stage 202 can retrieve instructions from one or more instruction streams where fetch stage 202 retrieves more than one instruction per clock cycle. Decoder stage 204 can interpret the instruction(s) provided by fetch stage 202.

Dependency check rename stage 206 can rename the registers referenced by instructions to prevent write-after-write (WAW) and write-after-read (WAR) stalls. Dependency check rename stage 206 maps logical register names provided by a compiler into physical register names that are stored in physical register file 228. Dependency check rename stage 206 consults map table 220 to determine which physical registers correspond to the logical register names referenced in the instructions provided by decoder stage 204. Dependency check rename stage 206 may also allocate physical register(s) for target(s) of an instruction. Dependency check rename stage 206 updates map table 220 with the allocated physical register(s) location for the instruction. Dependency check rename stage 206 may also perform a dependence cross-check of each instruction in a rename group. Dependency check rename stage 206 checks whether each younger instruction depends on an older instruction. Dependency check rename stage 206 updates map table 220 so that each younger instruction properly depends from each older instruction.

After the registers identified in each instruction have been renamed by dependency check rename stage 206, the instruction fusion stage 225 can determine whether instructions within the rename registers can be fused. The instruction fusion stage 225 can inspect instructions to determine an operand bit field size for each instruction. The instruction fusion stage 225 can compare the operand bit field size of each instruction to a predetermined threshold, for example, a 4-bit field. The instruction fusion stage 225 can fuse the instructions that meet the predetermined threshold, i.e., instructions having an operand size equal to or below 4 bits. Accordingly, the fused instructions can be completed in one clock cycle. The instruction fusion stage 225 can also determine whether instructions that do not meet the predetermined threshold would still benefit from fusion. While the fusion of instructions having an operand bit field size greater than the predetermined threshold cannot always be completed in one clock cycle, having these fused instructions complete in more than one clock cycle (two clock cycles) may be beneficial when addressing back-to-back instruction execution.

For example, in consideration of an instruction window having a width of six, an add immediate shifted (addis) can be fused with an or immediate (ori) instruction (addis+ori) and the fused instruction can be executed in one clock cycle. Also, a rotate left word immediate then with mask (rlwinm) instruction can be fused with an add (add) instruction (rlwinm+add); however, the fused instruction can vary in completion time, one clock cycle or two clock cycles, depending whether a rotation or shift is required to execute for the fused instruction. If a shift is performed, which can occur using an operand bit field size of 4 bits, the fused instruction can be executed in a single clock cycle. If a rotation is performed, which can occur using an operand bit field size of 5 bits, the fused instruction can be executed in two clock cycles. Other fused instruction pairs can be performed in one clock cycle depending on whether the operand bit field size meets a predetermined threshold, for example, 4 bits. Other fused instruction pairs can be performed in more than one clock cycle if the operand bit field size does not meet the predetermined threshold if fusion of the instructions would be beneficial in consideration of back-to-back instruction execution. Those instructions that do not meet the predetermined threshold and would not be beneficial when addressing back-to-back instruction execution are not fused.

The instruction fusion stage 225 can occur at other stages within the instruction pipeline. For example, the instruction fusion stage 225 can occur before instructions are entered into an instruction cache (I-cache), after instructions are removed from an instruction buffer (I-buffer) or when a trace cache is created.

Dispatching stage 208 can dispatch each instruction into issue queue 222 where each instruction waits for its respective input operands to become available. An instruction becomes ready to execute when the input operands for the instruction become available. Issue queue 222 can then issue each instruction that has received its respective input operands as ready to be executed. Register read stage 210 can retrieve the contents of each register location corresponding to each input operand of each issued instruction and provides each issued instruction to execution stage 212 to be executed using the retrieved contents of the operand registers.

Execution stage 212 can be implemented as a number of different types of execution units, e.g., a generic fixed point or floating point unit, or a specialized execution unit such as a graphics processing unit, encryption/decryption unit, coprocessor, XML, processing unit, or other execution unit, whether scalar or vector in nature. In addition, multiple execution units may be disposed in pipeline 200 such that multiple instructions may be issued per cycle.

Execution stage 212 can buffer store instructions into store queue 224. Execution stage 212 does not commit store instructions to memory until the store instructions reach retirement. Rather, store instructions including the memory address and store data may be buffered in store queue 224 until they reach retirement. This avoids write-after-read (WAR) and write-after-write (WAW) dependency problems where an earlier load instruction receives an incorrect value from the memory because a later store instruction was allowed to execute before the earlier load instruction. Execution stage 212 buffers load instructions in a load queue 230 until retirement. Execution stage 212 executes load instructions by accessing the location in memory and/or store queue 224 to obtain its data value and then the address and data for each load instruction are buffered in load queue 230. Execution stage 212 may read or write data values to and from data cache 226 rather than memory to speed up the execution of load instructions and store instructions.

After each instruction has been executed by execution stage 212, the results of each executed instruction may be written to physical register file 228 by write back stage 214. Reorder buffer 232 reorders each executed instruction from the data order in which each instruction was executed to the program order in which each instruction was ordered in the original program code. Commit stage 216 then stores the results of each executed instruction based on the order provided by reorder buffer 232 to memory.

Figure 3:
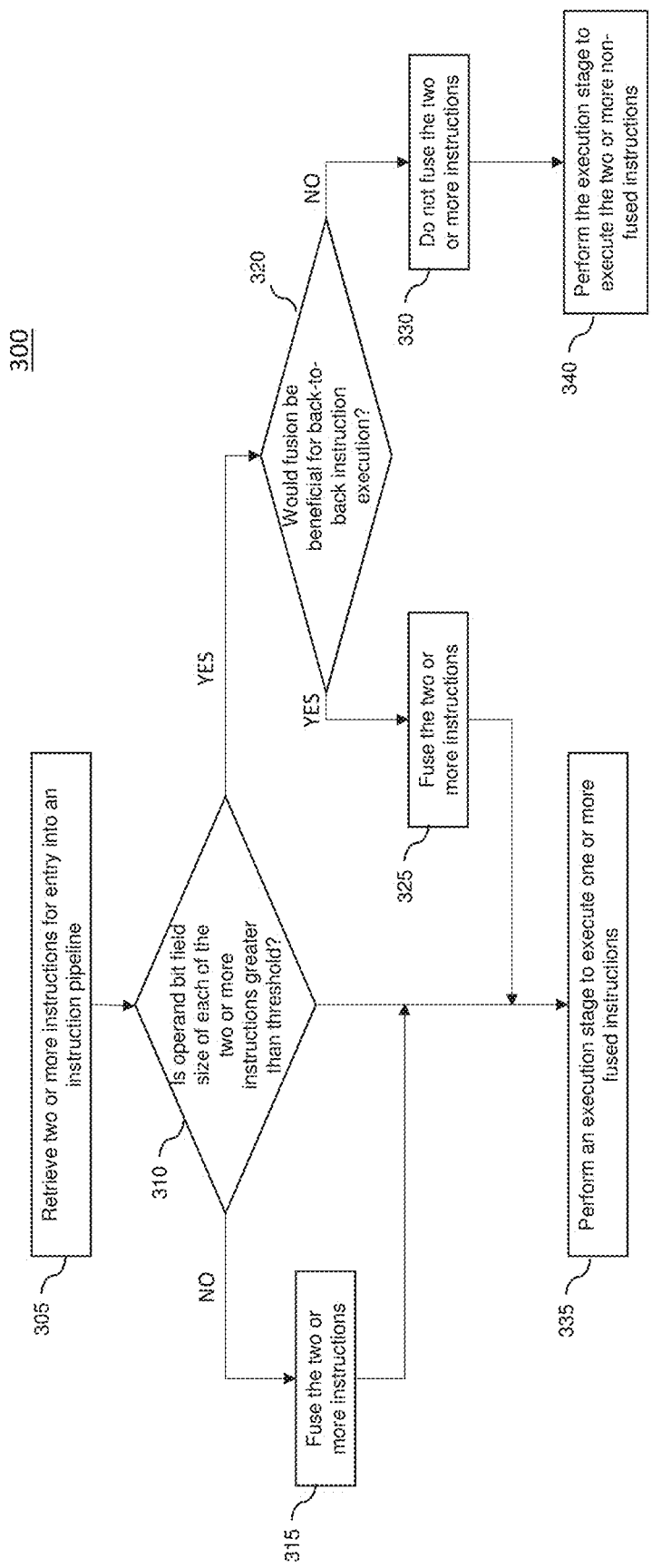
FIG. 3 is a flow diagram illustrating a method of dynamic fusion based on operand size in accordance with one or more embodiments of the present invention.

Turning now to FIG. 3, a flow diagram illustrating a method of dynamic fusion based on operand size 300 according to one or more embodiments of the present invention. At block 305, two or more instructions in an instruction stream can be retrieved by an instruction pipeline. At block 310, the instruction pipeline can determine an operand bit field size for each of the two or more received instructions and determine whether each instruction has a bit field size that meets a predetermined threshold, for example, 4 bits or less. If the two or more instructions both have an operand bit field meeting the predetermined threshold, the method proceeds to block 315 where the two or more instructions are fused. At block 335, the fused instructions from block 315 can be executed using an execution stage of the instruction pipeline.

If, at block 310, the two or more instructions have a bit field size that does not meet the predetermined threshold, the method proceeds to block 320 where a determination of whether fusion of the two or more instructions would be beneficial for back-to-back instruction execution occurs. If fusion of the two or more instructions considered at block 320 would be beneficial to beneficial to back-to-back instruction execution, the method proceeds to block 325 where the two or more instructions are fused. At block 335, the fused instructions from block 325 can be executed using an execution stage of the instruction pipeline.

If fusion of the two or more instructions at considered at block 320 would not be beneficial to beneficial to back-to-back instruction execution, the method proceeds to block 330 where the two or more instructions are not fused. At block 340, the non-fused instructions from block 330 can be executed using an execution stage of the instruction pipeline.

Figure 4:
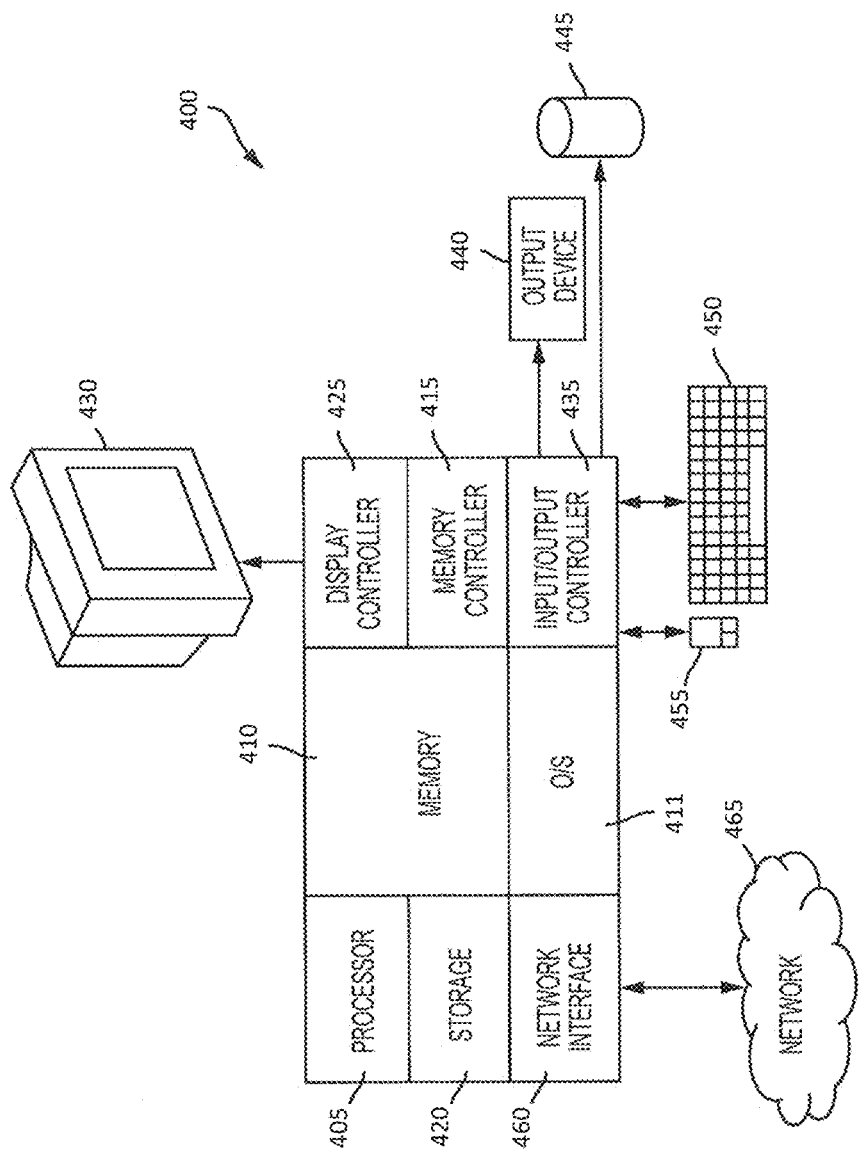
FIG. 4 depicts a block diagram of a computer system for implementing some or all aspects of dynamic fusion based on operand size in accordance with one or more embodiments of the present invention.

Turning now to FIG. 4, a block diagram of a computer system 400 for implementing some or all aspects of dynamic fusion based on operand size is generally shown according to one or more embodiments of the present invention. The processing described herein may be implemented in hardware, software (e.g., firmware), or a combination thereof. In an exemplary embodiment, the methods described may be implemented, at least in part, in hardware and may be part of the microprocessor of a special or general-purpose computer system 400, such as a mobile device, personal computer, workstation, minicomputer, or mainframe computer.

In an exemplary embodiment, as shown in FIG. 4, the computer system 400 includes a processor 405, memory 410 coupled to a memory controller 415, and one or more input devices 445 and/or output devices 540, such as peripherals, that are communicatively coupled via a local I/O controller 435. These devices 440 and 445 may include, for example, a printer, a scanner, a microphone, and the like. A conventional keyboard 450 and mouse 455 may be coupled to the I/O controller 435. The I/O controller 435 may be, for example, one or more buses or other wired or wireless connections, as are known in the art. The I/O controller 435 may have additional elements, which are omitted for simplicity, such as controllers, buffers (caches), drivers, repeaters, and receivers, to enable communications.

The I/O devices 440, 445 may further include devices that communicate both inputs and outputs, for instance disk and tape storage, a network interface card (NIC) or modulator/demodulator (for accessing other files, devices, systems, or a network), a radio frequency (RF) or other transceiver, a telephonic interface, a bridge, a router, and the like.

The processor 405 is a hardware device for executing hardware instructions or software, particularly those stored in memory 410. The processor 405 may be a custom made or commercially available processor, a central processing unit (CPU), an auxiliary processor among several processors associated with the computer system 400, a semiconductor based microprocessor (in the form of a microchip or chip set), a microprocessor, or other device for executing instructions. The processor 405 can include a cache such as, but not limited to, an instruction cache to speed up executable instruction fetch, a data cache to speed up data fetch and store, and a translation look-aside buffer (TLB) used to speed up virtual-to-physical address translation for both executable instructions and data. The cache may be organized as a hierarchy of more cache levels (L1, L2, etc.).

The memory 410 may include one or combinations of volatile memory elements (e.g., random access memory, RAM, such as DRAM, SRAM, SDRAM, etc.) and nonvolatile memory elements (e.g., ROM, erasable programmable read only memory (EPROM), electronically erasable programmable read only memory (EEPROM), programmable read only memory (PROM), tape, compact disc read only memory (CD-ROM), disk, diskette, cartridge, cassette or the like, etc.). Moreover, the memory 410 may incorporate electronic, magnetic, optical, or other types of storage media. Note that the memory 410 may have a distributed architecture, where various components are situated remote from one another but may be accessed by the processor 405.

The instructions in memory 410 may include one or more separate programs, each of which comprises an ordered listing of executable instructions for implementing logical functions. In the example of FIG. 4, the instructions in the memory 410 include a suitable operating system (OS) 411. The operating system 411 essentially may control the execution of other computer programs and provides scheduling, input-output control, file and data management, memory management, and communication control and related services.

Additional data, including, for example, instructions for the processor 405 or other retrievable information, may be stored in storage 420, which may be a storage device such as a hard disk drive or solid state drive. The stored instructions in memory 410 or in storage 420 may include those enabling the processor to execute one or more aspects of the dispatch systems and methods of this disclosure.

The computer system 400 may further include a display controller 425 coupled to a display 430. In an exemplary embodiment, the computer system 400 may further include a network interface 460 for coupling to a network 465. The network 465 may be an IP-based network for communication between the computer system 400 and an external server, client and the like via a broadband connection. The network 465 transmits and receives data between the computer system 400 and external systems. In an exemplary embodiment, the network 465 may be a managed IP network administered by a service provider. The network 465 may be implemented in a wireless fashion, e.g., using wireless protocols and technologies, such as WiFi, WiMax, etc. The network 465 may also be a packet-switched network such as a local area network, wide area network, metropolitan area network, the Internet, or other similar type of network environment. The network 465 may be a fixed wireless network, a wireless local area network (LAN), a wireless wide area network (WAN) a personal area network (PAN), a virtual private network (VPN), intranet or other suitable network system and may include equipment for receiving and transmitting signals.

Systems and methods for providing dynamic fusion based on operand size can be embodied, in whole or in part, in computer program products or in computer systems 400, such as that illustrated in FIG. 4. The disclosed systems and methods can inspect an operand bit field size for instructions and fuse instructions having an operand bit field size that meet a predetermined threshold. Fusion in consideration of an operand bit field size can provide a plurality of benefits, including: reduced processor latency, an improved per-thread performance, a reduction of a critical flow density, an increase in the number of instructions in flight and executed, use of fewer computing resources than those used when executing instructions individually.

Various embodiments of the invention are described herein with reference to the related drawings. Alternative embodiments of the invention can be devised without departing from the scope of this invention. Various connections and positional relationships (e.g., over, below, adjacent, etc.) are set forth between elements in the following description and in the drawings. These connections and/or positional relationships, unless specified otherwise, can be direct or indirect, and the present invention is not intended to be limiting in this respect. Accordingly, a coupling of entities can refer to either a direct or an indirect coupling, and a positional relationship between entities can be a direct or indirect positional relationship. Moreover, the various tasks and process steps described herein can be incorporated into a more comprehensive procedure or process having additional steps or functionality not described in detail herein.

The following definitions and abbreviations are to be used for the interpretation of the claims and the specification. As used herein, the terms "comprises," "comprising," "includes," "including," "has," "having," "contains" or "containing," or any other variation thereof, are intended to cover a non-exclusive inclusion. For example, a composition, a mixture, process, method, article, or apparatus that comprises a list of elements is not necessarily limited to only those elements but can include other elements not expressly listed or inherent to such composition, mixture, process, method, article, or apparatus.

Additionally, the term "exemplary" is used herein to mean "serving as an example, instance or illustration." Any embodiment or design described herein as "exemplary" is not necessarily to be construed as preferred or advantageous over other embodiments or designs. The terms "at least one" and "one or more" may be understood to include any integer number greater than or equal to one, i.e. one, two, three, four, etc. The terms "a plurality" may be understood to include any integer number greater than or equal to two, i.e. two, three, four, five, etc. The term "connection" may include both an indirect "connection" and a direct "connection."

The terms "about," "substantially," "approximately," and variations thereof, are intended to include the degree of error associated with measurement of the particular quantity based upon the equipment available at the time of filing the application. For example, "about" can include a range of ±8% or 5%, or 2% of a given value.

For the sake of brevity, conventional techniques related to making and using aspects of the invention may or may not be described in detail herein. In particular, various aspects of computing systems and specific computer programs to implement the various technical features described herein are well known. Accordingly, in the interest of brevity, many conventional implementation details are only mentioned briefly herein or are omitted entirely without providing the well-known system and/or process details.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Java, Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A computer-implemented method comprising:
   receiving, by a processor, a plurality of instructions at an instruction pipeline;
   determining, by the processor, an operand bit field size for each of the received instructions;
   comparing, by the processor, the operand bit field size of the received instructions to a predetermined threshold;
   fusing, by the processor, the received instructions based on the received instructions having the operand bit field size that is less than or equal to the predetermined threshold according to a result of the comparing;
   performing, by the processor, a second check on the received instructions based on the received instructions having the operand bit field size that is greater than the predetermined threshold according to the result of the comparing, wherein the second check is based on a criteria that differs from comparison of the operand bit field size to the predetermined threshold;
   fusing, by the processor, the received instructions based on the received instructions meeting the criteria according to a result of the second check; and
   performing, by the processor, an execution stage within the instruction pipeline to execute the received instructions as fused or non-fused instructions.

2. The computer-implemented method of claim 1, wherein the second check is whether the received instructions are back-to-back instructions such that fusion will result in one or more of a reduced processor latency, an improved per-thread performance, a reduction of a critical flow density, an increase in the number of instructions in flight and executed, use of fewer computing resources than those used when executing instructions individually.

3. The computer-implemented method of claim 2, wherein fused instructions resulting from the second check are executed in one clock cycle or two clock cycles.

4. The computer-implemented method of claim 2, wherein the second check includes a determination of whether a window size of the back-to-back instructions is less than or equal to an instruction window size.

5. The computer-implemented method of claim 1, wherein the predetermined threshold is 4 bits.

6. The computer-implemented method of claim 1, wherein the determination of the operand bit field size for each of the received plurality of instructions occurs after a register rename stage within the instruction pipeline.

7. The computer-implemented method of claim 1, wherein the processor is an out-of-order processor.

8. A system comprising:
   a memory having computer readable instructions; and
   one or more processors for executing the computer readable instructions, the computer readable instructions controlling the one or more processors to perform operations comprising:
   receiving a plurality of instructions at an instruction pipeline;
   determining an operand bit field size for each of the received instructions;
   comparing the operand bit field size of the received instructions to a predetermined threshold;
   fusing the received instructions based on the received instructions having the operand bit field size that is less than or equal to the predetermined threshold according to a result of the comparing;
   performing, by the processor, a second check on the received instructions based on the received instructions having the operand bit field size that is greater than the predetermined threshold according to the result of the comparing, wherein the second check is based on a criteria that differs from comparison of the operand bit field size to the predetermined threshold;
   fusing, by the processor, the received instructions based on the received instructions meeting the criteria according to a result of the second check; and
   performing an execution stage within the instruction pipeline to execute the received instructions as fused or non-fused instructions.

9. The system of claim 8, wherein the second check is whether the received instructions are back-to-back instructions such that fusion will result in one or more of a reduced processor latency, an improved per-thread performance, a reduction of a critical flow density, an increase in the number of instructions in flight and executed, use of fewer computing resources than those used when executing instructions individually.

10. The system of claim 9, wherein fused instructions resulting from the second check are executed in one clock cycle or two clock cycles.

11. The system of claim 9, wherein the second check includes a determination of whether a window size of the back-to-back instructions is less than or equal to an instruction window size.

12. The system of claim 8, wherein the predetermined threshold is 4 bits.

13. The system of claim 8, wherein the determination of the operand bit field size for each of the received plurality of instructions occurs after a register rename stage within the instruction pipeline.

14. The system of claim 8, wherein at least one of the one or more processors is an out-of-order processor.

15. A computer program product comprising a non-transitory computer readable storage medium having program instructions embodied therewith, the program instructions executable by a processor to cause the processor to perform operations comprising:
   receiving a plurality of instructions at an instruction pipeline;
   determining an operand bit field size for each of the received instructions;
   comparing the operand bit field size of the received instructions to a predetermined threshold;
   fusing the received instructions based on the received instructions having the operand bit field size that is less than or equal to the predetermined threshold according to a result of the comparing;
   performing a second check on the received instructions based on the received instructions having the operand bit field size that is greater than the predetermined threshold according to the result of the comparing, wherein the second check is based on a criteria that differs from comparison of the operand bit field size to the predetermined threshold;

fusing the received instructions based on the received instructions meeting the criteria according to a result of the second check; and performing an execution stage within the instruction pipeline to execute the received instructions as fused or non-fused instructions.

16. The computer program product of claim 15, wherein the second check is whether the received instructions are back-to-back instructions such that fusion will result in one or more of a reduced processor latency, an improved per-thread performance, a reduction of a critical flow density, an increase in the number of instructions in flight and executed, use of fewer computing resources than those used when executing instructions individually.

17. The computer program product of claim 16, wherein fused instructions resulting from the second check are executed in one clock cycle or two clock cycles.

18. The computer program product of claim 16, wherein the second check includes a determination of whether a window size of the back-to-back instructions is less than or equal to an instruction window size.

19. The computer program product of claim 15, wherein the predetermined threshold is 4 bits.

20. The computer program product of claim 15, wherein the determination of the operand bit field size for each of the received plurality of instructions occurs after a register rename stage within the instruction pipeline.

* * * * *